April 23, 1940.　　　　A. J. TURPIN　　　　2,197,954
VALVE
Filed June 28, 1939　　　　2 Sheets-Sheet 1
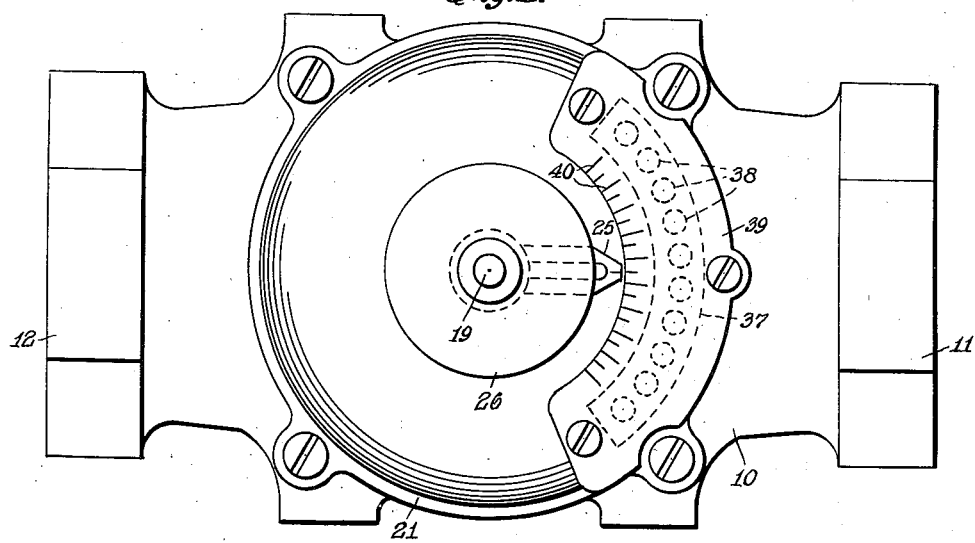
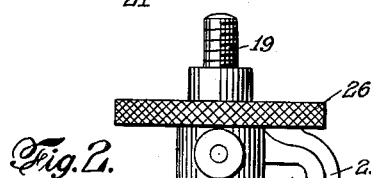
INVENTOR.
ALEXANDER J. TURPIN
BY
ATTORNEY.

April 23, 1940.  A. J. TURPIN  2,197,954
VALVE
Filed June 28, 1939  2 Sheets-Sheet 2
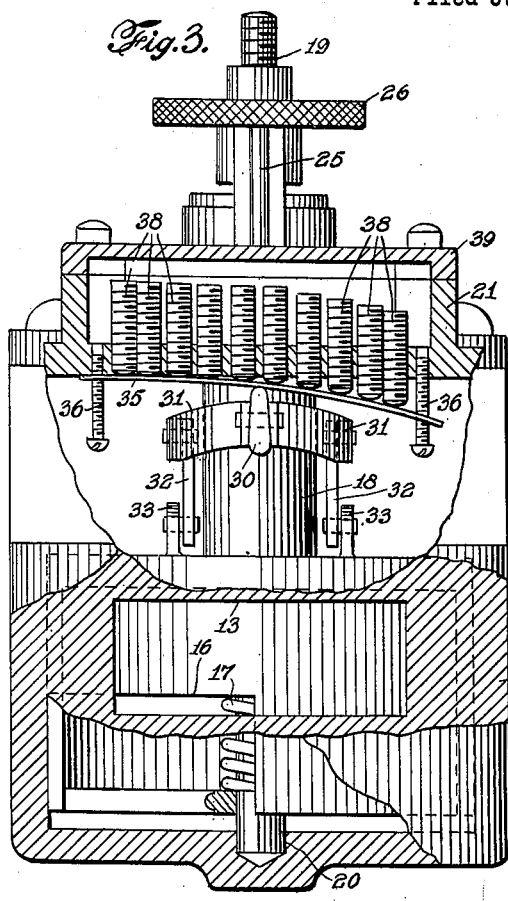
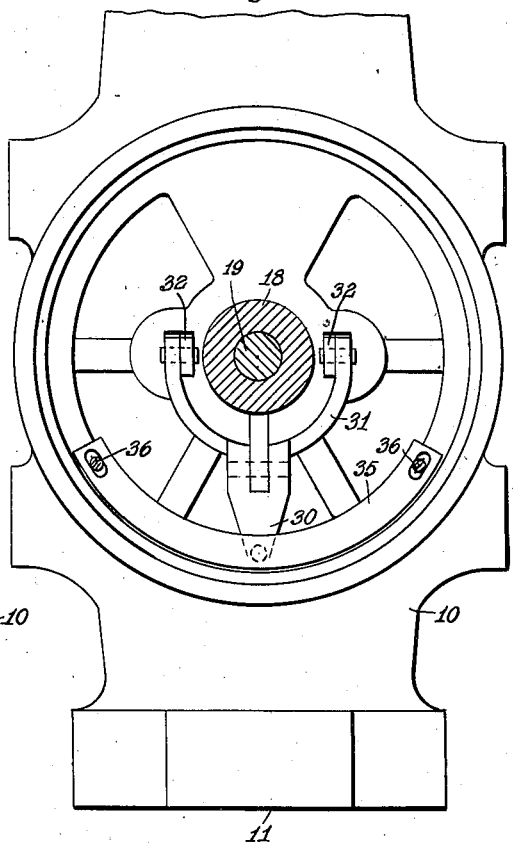
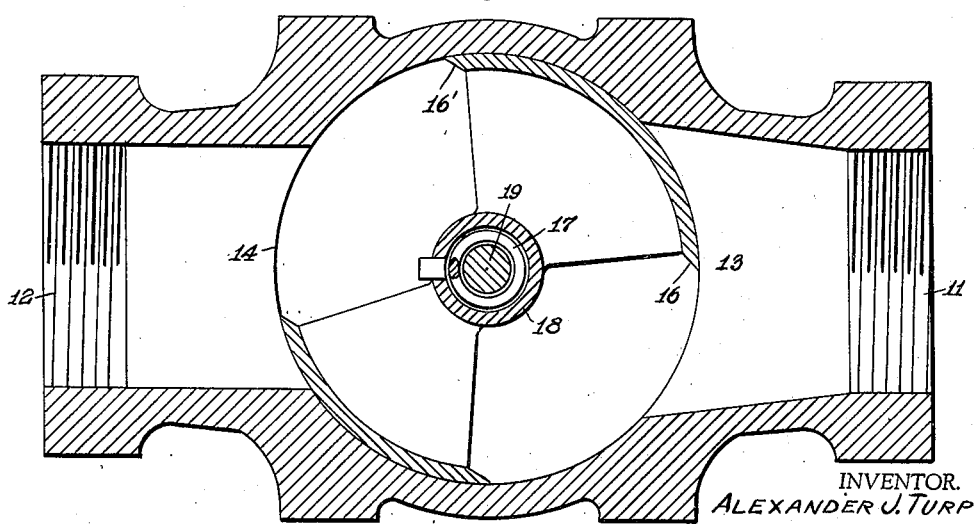
INVENTOR.
ALEXANDER J. TURPIN
BY
ATTORNEY.

Patented Apr. 23, 1940

2,197,954

UNITED STATES PATENT OFFICE 2,197,954

VALVE

Alexander J. Turpin, Stewart Manor, N. Y., assignor to Hauck Manufacturing Company, Brooklyn, N. Y., a corporation of New York Application June 28, 1939, Serial No. 281,519

6 Claims. (Cl. 251—92)

The invention relates to valves for controlling the flow of a fluid, and more particularly to a novel control in connection with the valve piece of the valve whereby the regulation of the flow therethrough may be according to a predetermined and adjustable setting.

The invention has for an object to provide a valve of this nature of simple and rugged construction and wherein the adjustment to secure the control desired may be effected in a convenient and efficient manner, and according to any desired law or variation.

A further object of the invention is to provide a valve element and mounting therefor such that the flow control may be approximated in the design of the valve element and the final and more accurate control secured through the novel mounting.

Still another object of the invention is to so mount the valve piece that the same may have both a rotary and an axial movement.

The invention has for another object to mount within the valve body all operating parts for effecting control of the valve piece.

In carrying out the invention, a casing or valve body is provided with an inlet and an outlet to receive and discharge, respectively, fluid whose flow is to be controlled by the valve, suitable ports being provided to this end in the valve body. With these ports is designed to cooperate a valve piece in the nature of a hollow cylinder provided with openings of predetermined shape and adapted for registry with the respective ports in the valve body. Provision is made for rotating the valve piece and also for moving the same axially past the said ports as it is turned, the axial movement being according to a predetermined setting of an adjustable cam member.

The nature of the invention, however, will best be understood when described in connection with the accompanying drawings, in which:

Fig. 1 is a plan view of the novel valve, and Fig. 2 is a longitudinal section thereof.

Fig. 3 is a transverse vertical section taken on the line 3—3, Fig. 2 of the drawings, and looking in the directions of the arrows.

Figs. 4 and 5 are horizontal sections taken respectively on the lines 4—4 and 5—5, Fig. 2 of the drawings, and looking in the direction of the arrows.

Referring to the drawings, 10 designates a suitable casing or valve body having the inlet 11 and outlet 12 communicating with its interior through corresponding ports 13 and 14 provided in the casing wall, thereby affording a passageway for the flow of a fluid through the valve. The flow is designed to be interrupted and controlled by the interposition of a rotary valve piece in the nature of a hollow cylinder 15 which is mounted to slide also axially of the valve body and has provided therein oppositely disposed rectangular openings 16 and 16' for registry with the respective ports 13 and 14 of predetermined size. As shown, the valve piece is seated on the bottom of the casing and is yieldingly held thereto by means of a coil spring 17 interposed between the bottom of the cylinder and an enlargement 18 at an intermediate portion of the operating spindle or valve stem 19 for the valve.

The inner end of the spindle is seated in a recess 20 of the bottom of the valve body and is held in position by the removable top or cap member 21 of the valve contacting with a shoulder 22 formed by the outer end of its enlarged portion 18. The said top provides, also, a bearing 23 for the spindle which projects beyond the top through a stuffing box 24. An indicator element 25 may be attached to the spindle and carries a knurled flange 26 as a finger piece for rotating said spindle.

The said valve 15 is keyed to the spindle 19 to rotate therewith as well as to move vertically or axially thereof, as will hereinafter be more fully set forth. In the closed position of the valve, the openings 16, 16' thereof will be located entirely below the respective ports 13 and 14 as said valve piece contacts the bottom of the casing through the action of spring 17; and if the said valve-piece were constructed to have no vertical movement, this condition would be maintained during any rotation of the said spindle. However, as soon as the spindle is rotated, the valve piece is caused to lift or move axially of the spindle to an extent determined by an adjustment hereinafter described, so that not only will the effective opening circumferentially be increased with the rotation of the spindle, but also vertically.

To accomplish this vertical motion of the valve piece, which is assisted by the action of spring 17, the said valve piece is connected to a bell crank carried by the said enlargerment 18 and comprising the cam arm 30 and the bifurcated arm 31 whose members are attached to links 32 pivoted to a pair of oppositely disposed ears 33 extending from the rim of the valve piece. Arms 31 embrace the enlarged portion 18 of the spindle, while the free end of the arm 30 is designed to engage a cam strip 35 of flexible material such as spring steel and suspended from the underside of the cover 21 as by means of the studs 36, the strip being arcuate and of a length to conform to the range of rotary movement of the spindle.

Provision is made, also, to vary the outside boundary line or face of the cam strip to permit the desired rising or falling movement of the valve piece in accordance with the rotation of the spindle. To secure such adjustment, an arcuate groove 37 is provided in the cover 21 immediately above the strip and following its arc, and a plurality of pins 38 are threaded adjacently therein and extend through the bottom of the groove to contact the strip 35 and conform the same to the required curvature by accordingly projecting the extending ends of the pins. These are slotted at the outer end to admit a suitable implement such as a screw driver or the like in effecting the adjustment. A cover plate 39 may be provided over the groove to prevent too-ready access to the pins and to protect the same against damage or displacement as well as to prevent leakage. The plate, also, may carry suitable graduations 40 upon its exposed face and cooperating with the indicator element 25.

By this expedient, after a valve piece of the proper design for the general result has been installed, the cam strip may be flexed to a desired contour, in order to modify the control for closer regulation through the valve openings 16 and 16', by the setting of the pins which determine the axial displacement of the valve piece in accordance with its rotation.

I claim:

1. A valve, comprising a body provided with an inlet port and an outlet port and a removable cover, a cylindrical valve piece mounted therein having openings adapted for registry with the respective ports, a spindle extending through the cover and the valve body and connected with the valve piece to rotate the same, resilient means for imparting axial movement of the valve piece relatively to the spindle, and means to control the extent of axial movement of said valve piece and comprising a lever member connected with the valve piece and an adjustable and flexible cam strip carried by the cover of the valve and engaged by said lever member.

2. A valve, comprising a body provided with an inlet port and an outlet port and a removable cover, a cylindrical valve piece mounted therein having openings adapted for registry with the respective ports, a spindle extending through the cover and the valve body and connected with the valve piece to rotate the same, resilient means acting between the spindle and the bottom of the valve for imparting axial movement of the valve piece relatively to the spindle, and means to control the extent of axial movement of said valve piece and comprising a lever member connected with the valve piece and an adjustable and flexible cam strip suspended from the underside of the cover of the valve and engaged by said lever member.

3. A valve, comprising a body provided with an inlet port and an outlet port and a removable cover, a cylindrical valve piece mounted therein having openings adapted for registry with the respective ports, a spindle extending through the cover and the valve body and connected with the valve piece to rotate the same, resilient means for imparting axial movement of the valve piece relatively to the spindle, and means to control the extent of axial movement of said valve piece and comprising a bell crank lever one arm of which is bifurcated and embraces the spindle, links connecting the bifurcated arm to the valve, a resilient cam strip carried by the cover of the valve and engaging the other arm of the bell crank, and pins screwed into the said cover extending therethrough to engage the cam strip.

4. A valve, comprising a body provided with an inlet port and an outlet port and a removable cover, a cylindrical valve piece mounted therein having openings adapted for registry with the respective ports, a spindle extending through the cover and the valve body and connected with the valve piece to rotate the same, resilient means for imparting axial movement of the valve piece relatively to the spindle, and means to control the extent of axial movement of said valve piece and comprising a lever member connected with the valve piece and a flexible cam strip carried by the cover of the valve and engaged by said lever member, said cover being provided with an arcuate groove, and adjacently disposed pins threaded through said groove for engaging the said cam strip.

5. A valve, comprising a body provided with an inlet port and an outlet port and a removable cover, a cylindrical valve piece mounted therein having openings adapted for registry with the respective ports, a spindle extending through the cover and the valve body and connected with the valve piece to rotate the same, resilient means for imparting axial movement of the valve piece relatively to the spindle, and means to control the extent of axial movement of said valve piece and comprising a lever member connected with the valve piece and a flexible cam strip carried by the cover of the valve and engaged by said lever member, said cover being provided with an arcuate groove, and adjacently disposed pins threaded through said groove for engaging the said cam strip, together with a cover plate sealing said groove.

6. A valve, comprising a body provided with an inlet port and an outlet port and a removable cover, a cylindrical valve piece mounted therein having openings adapted for registry with the respective ports, a spindle extending through the cover and the valve body and connected with the valve piece to rotate the same, an indicator element carried by the outer end of the spindle, resilient means for imparting axial movement of the valve piece relatively to the spindle, means to control the extent of axial movement of said valve piece and comprising a lever member connected with the valve piece and a flexible cam strip carried by the removable cover and engaged by the lever member, said cover being provided with an arcuate groove, and adjacently disposed pins threaded through said groove for engaging the said cam strip, together with a cover plate sealing said groove and bearing a scale for cooperation with the indicator element.

ALEXANDER J. TURPIN.